United States Patent

Hayashi et al.

Patent Number: 5,858,414
Date of Patent: Jan. 12, 1999

[54] COOLING DEVICE FOR PLASTIC MOLDING

[75] Inventors: Ryutaro Hayashi, Osaka, Japan; Kazuya Mizuno, Duluth, Ga.

[73] Assignees: Kawata Mfg. Co., Ltd., Osaka, Japan; Atlanta Precision Moldings Co., Ltd., Duluth, Ga.

[21] Appl. No.: 762,712

[22] Filed: Dec. 10, 1996

[30] Foreign Application Priority Data

Jul. 11, 1996 [JP] Japan ................................. 8-181826

[51] Int. Cl.⁶ ........................................ B29C 71/02
[52] U.S. Cl. .......................... 425/73; 264/237; 425/143; 425/548; 425/556
[58] Field of Search .................... 264/40.6, 237, 264/297.2, 328.14, 334, 348; 425/73, 143, 546, 548, 556, 404; 62/378

[56] References Cited

U.S. PATENT DOCUMENTS

| | | | |
|---|---|---|---|
| 2,642,621 | 6/1953 | Amo | 264/237 |
| 3,835,209 | 9/1974 | Karabedian | 264/40.6 |
| 4,101,614 | 7/1978 | Havens | 264/40.6 |
| 4,514,166 | 4/1985 | Ichizawa et al. | 264/336 |
| 5,135,685 | 8/1992 | Masuhara et al. | 264/40.6 |
| 5,250,252 | 10/1993 | Siegenthaler | 425/73 |
| 5,288,450 | 2/1994 | Koizumi et al. | 264/297.2 |
| 5,401,448 | 3/1995 | Ricciardi et al. | 264/40.6 |
| 5,585,063 | 12/1996 | Slater et al. | 264/2.6 |
| 5,620,715 | 4/1997 | Hart et al. | 425/143 |
| 5,686,026 | 11/1997 | Ebina | 264/328.16 |

FOREIGN PATENT DOCUMENTS 2405813   6/1979   France ................................. 264/556

*Primary Examiner*—Jill L. Heitbrink
*Attorney, Agent, or Firm*—Kubovcik & Kubovcik

[57] ABSTRACT

A cooling device for plastic moldings and a cooling method therefor shortening the cooling time required for the moldings 6 to be cooled in the die 3, without doing rapid cooling in the die 3, and can also prevent deformation such as warp of the moldings 6. The cooling device for air-cooling plastic moldings which are formed by a plastic molding machine 1 having a take-out portion 10 for taking out the moldings 6 and are taken out from the take-out portion 10 comprises an air cooling means 18 which is located in the vicinity of said take-out portion 10 for blowing cooling air over said moldings 6 immediately after being taken out from said take-out portion 10. The cooling device can be used to blow cooling air over the moldings 6 immediately after the moldings are taken out from said take-out portion 10.

3 Claims, 4 Drawing Sheets

COOLING DEVICE FOR PLASTIC MOLDING

BACKGROUND OF THE INVENTION

1. Field of the Invention

This invention relates to a cooling device for air-cooling moldings formed by a plastic molding machine, and a cooling method therefor.

2. Description of the Background Arts

Generally, for molding plastic by use of a plastic molding machine such as an injection molding machine, following steps are taken: plastics to be molded are supplied to a molding machine, before a die is closed; the plastics are heated to be plasticized in a cylinder of the injection molding machine and then the plasticized plastics are injected into the die from a nozzle, by a plunger being moved forward; after the die is kept at a pressure for a fixed time, the plunger is moved backward; and after some cooling time is given for the moldings in the die to be cooled down, the die is opened to take out the moldings formed into a predetermined shape.

In the molding steps of this kind, the process from closing the die to opening the die to take out the moldings is usually repeated as one production cycle. The time required for the one production cycle depends principally on injection time and cooling time. For achieving an improved productivity, acceleration of the production cycle, among others, shortening the cooling time, is being desired. For full cooling of the moldings in the die, the cooling time gets longer. On the other hand, for rapid cooling of the moldings in the die, a special cooling device is needed and the die will be complicated in structure and also must be made of materials capable of resisting an intense heat history caused by the rapid cooling, thus causing increase in the cost of production of the die. In addition, the rapid cooling introduces a problem that a dew condensation is caused on the surface of the die.

If the die is opened without fully cooling the moldings in the die, that may shorten the cooling time, but that can cause a problem that the moldings are deformed or warped after being taken out from the die.

There exists a prior art method according to which fans or equivalent are used in the process of transferring the moldings to air-cool the moldings taken out from the plastic molding machine, for the help of the cooling. But, such fans do not blow cooling air over the moldings from immediately after the moldings are taken out, so that they are not so useful for shortening the cooling time.

SUMMARY OF THE INVENTION

An object of the invention is to provide a cooling device for plastic moldings and a cooling method therefor which can shorten cooling time required for the moldings to be cooled down in the die without rapid cooling of the moldings in the die and also prevent deformation such as warp of the moldings.

The invention is directed to a novel cooling device for air-cooling plastic moldings which are formed by a plastic molding machine having a take-out portion for taking out the moldings and are taken out from the take-out portion, the cooling device comprising air cooling means which is located in the vicinity of the take-out portion for blowing cooling air over the moldings immediately after being taken out from the take-out portion. According to the cooling device of the invention, since the cooling air is blown over the moldings immediately after being taken out from the take-out portion, the cooling operation can be done in the train of the take-out operation via the air cooling means and the need for the full cooling of the moldings in the die can be eliminated. Thus, the time required for the moldings to be cooled in the die can be shortened, while also undesired deformation such as warp of the moldings can be avoided. This can provide the results that variations in shape of the formed moldings can be avoided to consistently obtain the moldings of the predetermined shape with high stability and that the production cycle can be accelerated to provide improved productivity.

Preferably, the air cooling means is adapted to blow the cooling air over the moldings within 10 seconds after the moldings are taken out from the take-out portion. This way of air-blowing enables the time for the moldings after being taken out from the die not to be cooled to be rather reduced. Thus, the moldings can be cooled on a nearly continual basis from in the die to further shorten the cooling time and also possible deformation of the moldings can be further reduced.

Desirably, the air cooling means are adapted to blow the cooling air on a specified part of the molding. The air-blowing on the specified parts of the moldings enables the moldings immediately after being taken out and not yet invariant in heat distribution to be partially cooled down at the specified parts as are going to be deformed in a direction according to the heat distribution. Thus, undesired deformation of the moldings can be prevented or corrected effectively.

Further, preferably, the air cooling means comprises a plurality of ventilation fans, each of which is capable of blowing the cooling air on different parts of the molding and also regulating the volume of air independently. This can provide the result that the moldings immediately after being taken out and not yet invariant in heat distribution can be cooled down under a more suitable condition according to the heat distribution to prevent or correct the deformation of the molding more effectively.

Further, it is desirable that the cooling device for plastic moldings according to the invention further comprises sensing means for detecting temperature of the moldings and a controller which can regulate the volume of air of the air cooling means to set the temperature of the moldings at a predetermined value after having compared a detected value of temperature of the moldings got from the sensing means with a preset value of temperature of the moldings. The use of the sensing means and controller can ensure uniform shape of the moldings consistently, because, when temperature of the moldings varies with fluctuations in atmosphere temperature and the like to cause possible deformation of the moldings, the temperature variation of the moldings is detected by the sensing means and the volume of air of the air cooling means is regulated by the controller.

Thus, the cooling device for plastic moldings of the invention is particularly suitable for cooling down the moldings in the form of sheets which are easy to deform especially right after being taken out.

Further, the invention is also directed to a novel cooling method for air-cooling the plastic moldings which are formed by a plastic molding machine having a take-out portion for taking out the moldings and are taken out from the take-out portion, in the method of which cooling air is blown on the moldings immediately after being from said the take-out portion. The use of this cooling method enables the cooling operation to be done in the train of the take-out operation, with the need for the full cooling of the moldings in the die eliminated, as mentioned above. Thus, the time required for the moldings to be cooled in the die can be shortened, while also undesired deformation such as warp of the moldings can be avoided. This can provide the results that variations in shape of the formed moldings can be prevented to consistently obtain moldings of a predetermined shape with high stability and that the production cycle can be accelerated to provide improved productivity.

DETAILED DESCRIPTION OF PREFERRED EMBODIMENTS

Figure 1:
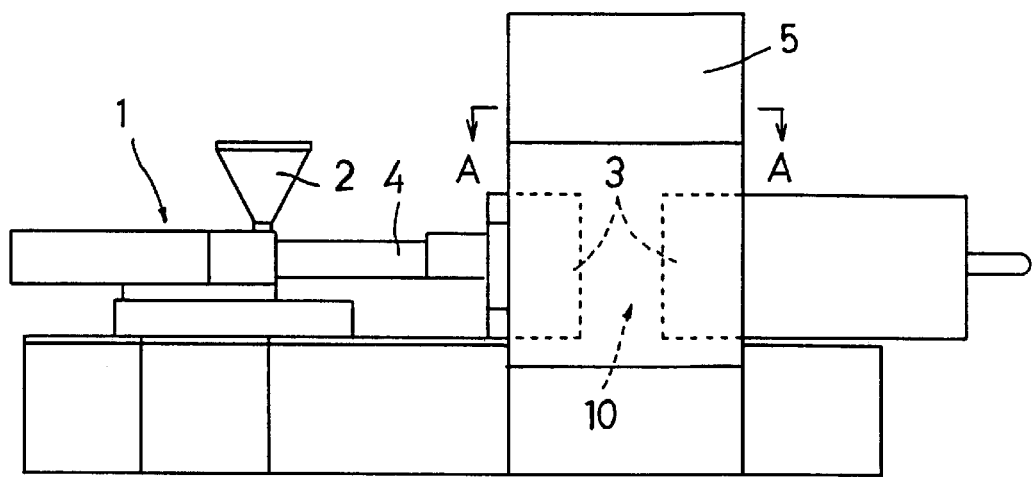
FIG. 1 is a side view showing an injection molding machine to which the cooling device for plastic moldings of the invention is applied.

FIG. 1 shows an exemplary embodiment in which the cooling device for plastic moldings of the invention is applied to an injection molding machine 1 used as a plastic molding machine. This injection molding machine 1 comprises a hopper 2 to which raw materials of plastic are supplied, an injection unit 4 via which the supplied materials are heated and plasticized and thereafter are injected, and a die 3 by which the injected plastic is formed into a predetermined shape.

The plastic supplied from the hopper 2 is injected into the die 3 via the injection unit 4 to be formed into a predetermined shape. After the interior of the die 3 is kept at a pressure for a fixed time and some cooling time is given for the die to be cooled, the die 3 is opened at the take-out part 10 to take out the moldings. In this embodiment, the formed molding 6 has a form of sheet like a container for a compact disc.

Figure 2:
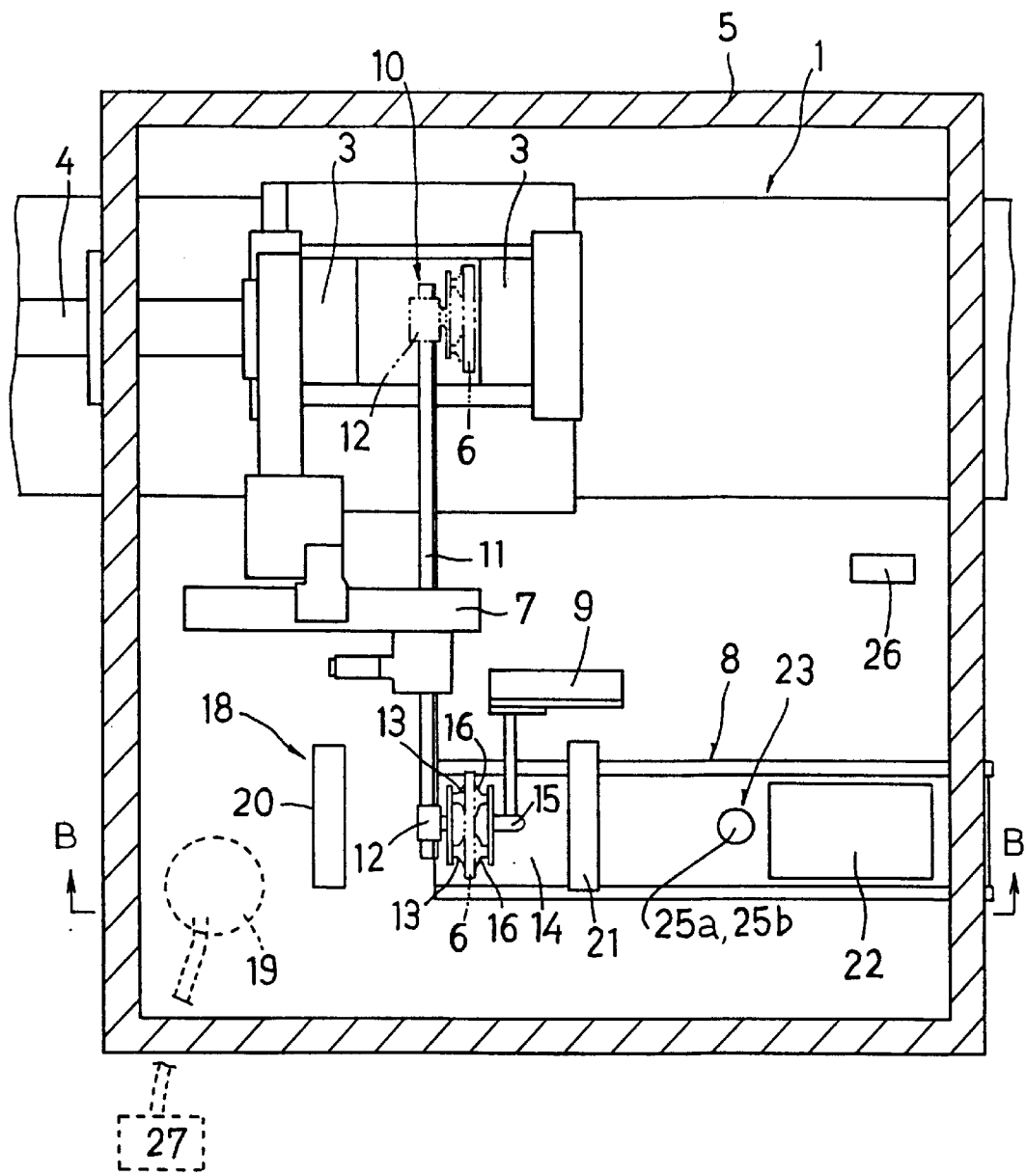
FIG. 2 is across section of a cooling booth taken on line A—A in FIG. 1.
Figure 3:
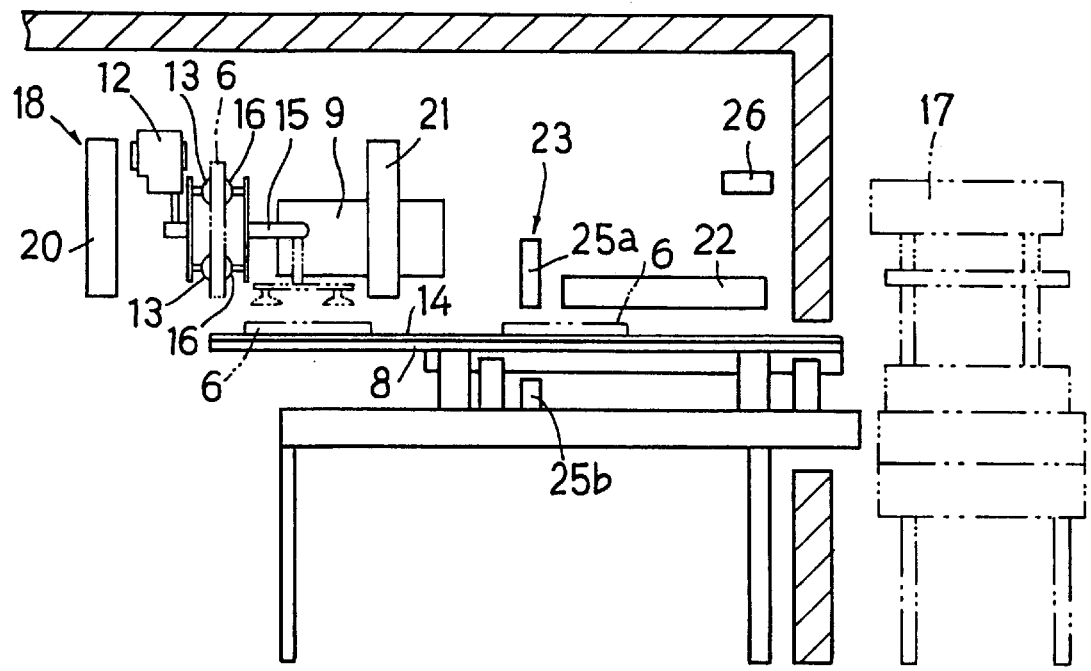
FIG. 3 is a cross section of the cooling booth taken on line B—B in FIG. 2.

As shown in FIGS. 2 and 3, the injection molding machine 1 is provided with a cooling booth 5 to surround the take-out portion 10 at which the die 3 is opened. An air duct 19 for the air conditioning device 27 is arranged in the cooling booth 5 to keep the temperature of the cooling booth 5 at a constant temperature.

In the booth 5, there are provided a conveyer 8 for carrying the moldings 6, a fetching machine 7 for taking out the moldings 6 from the die 3 and a receiving machine 9 for receiving the moldings 6 taken out by the fetching machine 7 and dropping the moldings 6 on the conveyer 8, in addition to the injection molding machine 1.

As shown in FIG. 2, the fetching machine 7 comprises a support arm 11, one end of which extends to the take-out portion 10 and the other end of which extends over the conveyer 8, and a puller 12 which is so mounted on the support arm 11 as to be selectably movable between a taken-out position at which the molding 6 is taken out in the take-out portion 10 (a position indicated by a virtal line in FIG. 2) and a transferred position at which the molding 6 is received above the conveyer 8 by the receiving machine 9 (a position indicated by a solid line in FIG. 2). The puller 12 has a suction unit 13 for sucking and holding the moldings 6.

In use, the puller 12 is positioned at the taken-out position so that the suction unit 13 can suck and pull the moldings 6 right after being molded and hold them. Thereafter, the puller 12 holding the moldings 6 is slid along the support arm 11 to the transferred position over the conveyer 8. And the moldings 6 are transferred from the puller 12 to the receiving machine 9 as mentioned later.

The receiving machine 9 comprises a receiver 15 which is capable of swing between a transferred position at which the receiver 15 is in opposition to the the puller 12 positioned at the transferred position over the conveyer 8 (a position indicated by a solid line in FIG. 3) and a dropping position at which the receiver 15 is in opposition to a carrying surface 14 of the conveyer 8 (a position indicated in a virtual line in FIG. 3). The receiver 15 has a suction unit 16 for sucking and holding the moldings 6.

When the puller 12 holding the moldings 6 is positioned at the transferred position above the conveyer 8, the receiver 15 is positioned at the transferred position at which the receiver 15 is in opposition to the puller 12 so that the suction unit 16 of the receiver 15 can suck and hold the moldings 6. When the suction is released from the suction unit 13 of the puller 12, the receiver 15 operates to receive the moldings 6 from the puller 12. And, when the receiver 15 is swung downward to be positioned at the dropping position at which the receiver 15 is in opposition to the carrying surface 14 of the conveyer 8, the suction is released from the suction unit 16 to drop the moldings 6 down on the conveyer 8.

The suction and release from the suction unit 13 of the puller 12 and from the suction unit 16 of the receiving unit 15 is made by air.

The moldings 6 dropped on the conveyer 8 are carried by the conveyer 8 to an accumulation device 17 located at the outside of the cooling booth 5 and are stocked by the accumulation device 17.

In this process of forming, taking out, and carrying the moldings, the cooling device for the plastic molding machine of the invention comprises an air cooling means 18 which is located in the vicinity of the take-out portion 10, via which the moldings 6 are taken out from the injection molding machine 1, so as to air-cool the moldings 6 right after being taken out from the take-out portion 10.

The air cooling means 18 is provided with a first ventilation fan 20 and a second ventilation fan 21, which are located at two opposite positions facing each other across a location at which the puller 12 of the fetching machine 7 is placed above the conveyer 8 and the receiver 15 of the receiving machine 9 is opposed to the puller 12, as shown in FIGS. 2 and 3.

The first ventilation fan 20 gives cooling air to the moldings 6 from a back side of the puller 12 and the second ventilation fan 21 gives cooling air to the moldings 6 from a back side of the receiver 15. In other words, the ventilation fans 20, 21 can blow the cooling air over the moldings 6 from the sides opposite to each other to cool down the moldings 6 at different specified parts. Also, each of these first and second fans 20 and 21 is so designed as to regulate the volume of air.

The air cooling means 18 is further provided with a third ventilation fan 22, which is located downstream of the second ventilation fan 21 with respect to a conveyance direction of the conveyer 8 and in opposition to the carrying surface 14 of the conveyer 8. The third ventilation fan gives cooling air to the moldings 6 being carried by the conveyer 8 to supplement the cooling of the moldings 6 given by the first and second fans.

Thus, the air cooling means 18 enables the cooling air to be blown over the moldings 6 immediately after being taken out from the take-out portion 10, so that the cooling operation can be done in the train of the take-out operation via the air cooling means 18 and the need for the full cooling of the moldings in the die 3 can be eliminated. This can shorten the time required for the moldings 6 to be cooled in the die 3, while also avoiding undesired deformation such as warp of the taken-out moldings. Therefore, variations in shape of the formed moldings 6 can be prevented to consistently obtain the moldings of the fixed shape with high stability, and besides the production cycle can be accelerated to provide improved productivity.

Further, the air cooling means 18 is so designed as to blow the cooling air over the moldings 6 within 10 seconds after the moldings 6 are taken out from the take-out portion 10. In the abovesaid construction, it takes about 2 seconds for the puller 12 to take out the moldings 6 right after being molded and then move along the support arm 11 to a given place above the conveyer 8. The first ventilation fan 20 and the second ventilation fan 21 can cool down the moldings 6 within 2 seconds from right after the moldings 6 are taken out. Thus, the moldings 6 being cooled in the die 3 are sequentially cooled down by the air cooling means 18 in a very short time after they are taken out from the die 3. Accordingly, the time for the moldings 6 to be cooled off can be shortened further, while also deformation of the moldings 6 can be further reduced.

Also, since the first ventilation fan 20 and the second ventilation fan 21 can blow the cooling air to the moldings 6 from opposite sides to each other to cool down the moldings 6 at different, specified parts, even when the moldings 6 immediately after being taken out and not yet invariant in heat distribution are going to deform at a specified parts thereof according to the heat distribution, the specified part can be cooled down partially, by for example stopping either the first ventilating fan 20 or the second ventilating fan 21 blowing the cooling air or changing the volume of air from the first and second fans 20, 21, to prevent or correct the deformation of the moldings 6 effectively.

Further, the cooling device for plastic moldings according to the invention further comprises a sensing means 23 for detecting a temperature of the moldings 6 and a controller 24 which can regulate the volume of air of the air cooling means 18 to reset the temperature of the moldings 6 at a predetermined value after having compared a detected value of temperature of the moldings 6 got from the sensing means 23 with a preset value of temperature of the moldings 6.

More specifically, the sensing means 23 comprises infrared temperature sensors 25a, 25b which are respectively located above and below the carrying surface 14 of the conveyer 8 between the second ventilation fan 21 and the third ventilation fan 22, as shown in FIG. 3.

Figure 4:
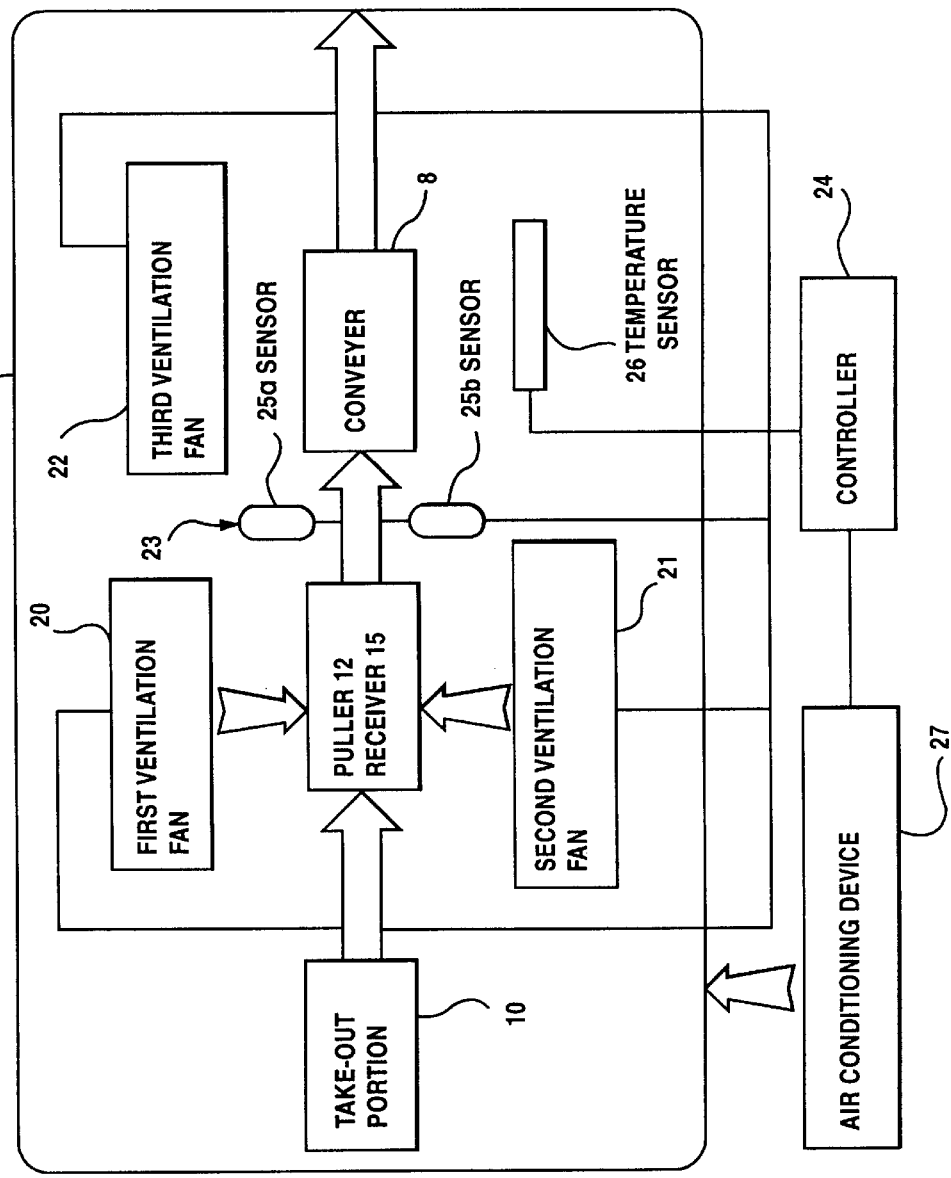
FIG. 4 is an illustration to show a temperature control mechanism in the cooling booth in FIG. 2.

As shown in FIG. 4, the surface temperature of the moldings 6 detected by the sensors 25a, 25b is entered into the controller 24 as a detected value, which is then compared with the preset value of the surface temperature of the moldings 6 by the controller 24. When the detected value is found to be different over the preset value, a signal to regulate the volume of air to agree between the detected value and the preset value is output to the respective fans 20, 21 and 22 to control the surface temperature of the moldings 6 at a predetermined value consistently.

By this control, the surface temperature of the moldings 6 can be directly detected by the sensors 25a and 25b to manage a running state in the molding process on a direct and continual basis. Accordingly, when temperatures of the moldings 6 vary with fluctuations in atmosphere temperature and the like to cause possible deformation of the moldings 6, the temperature variation of the moldings 6 is detected by the sensing means 23 and the volume of air from the respective fans 20, 21 and 22 is corrected by the controller 24, thus ensuring uniform shape of the moldings 6 consistently.

Further, in this embodiment, a temperature sensor 26 for detecting a temperature of the interior of the cooling booth 5 is further provided in the cooling booth 5. A detection signal from the temperature sensor 26 is entered in the controller 24 and in turn the output signal from the controller 24 is given to an air conditioning device 27. This arrangement, by which the temperature of the interior of the cooling booth 5 is controlled, in addition to the temperature of the moldings 6 being controlled by the sensor 25 and the fans 20, 21 and 22, enables the fluctuations in atmosphere temperature to be reduced to control the temperature of the moldings 6 with further accuracy.

As mentioned above, the cooling device for plastic moldings according to the invention enables the time required for the moldings 6 to be cooled in the die 3 to be shortened and undesired deformation such as warp of the moldings 6 to be avoided.

Accordingly, the cooling device of the invention is particularly suitable for cooling the moldings 6 having the form of a sheet, such as containers for compact discs which are easy to deform especially immediately after being taken out from the die.

Though the injection molding machine is exemplified in this embodiment as a plastic molding machine, the cooling device of plastic molding machine according to the invention is applicable to known plastic molding machines such as compression molding machines, extrusion molding machines, etc..

Further, the cooling booth 5 which is used in the embodiment may be dispensable. Alternatively, instead of using the cooling booth 5, an interior of a factory to form the moldings may be air-conditioned in its entirety.

What is claimed is:

1. A molded object cooling device for use with an injection molding machine having a take-out portion in which a mold is opened; said cooling device comprising a fetching means for taking out a molded object from said take-out portion;

a receiving means for receiving said molded object taken out from said take-out portion by said fetching means and for placing said molded object on a conveyor, said fetching means including a puller for holding said molded object and which is movable between a take-out position at which said molded object is taken out from said take-out portion and a transfer position at which said molded object is transferred to said receiving means, and said receiving means including a receiver for receiving and holding said molded object and which is movable between a receiving position for receiving said molded object which is opposite said transfer position and a resting position at which said molded object is placed on said conveyor, and air cooling means having a first ventilation fan for blowing cooling air over said molded object from a back side of said puller and a second ventilation fan for blowing cooling air over said molded object from a back side of said receiver at respective positions facing each other across said puller at said transfer position and across said receiver at said receiving position, said air cooling means being adapted to independently adjust a volume of air of said first ventilation fan and a volume of air of said second ventilation fan.

2. The molded object cooling device according to claim 1, said cooling device further comprising a sensing means for detecting temperature of the molded object and a controller which can independently regulate the volume of air from said first ventilation fan and the volume of air from said second ventilation fan to set the temperature of the molded object at a predetermined value after having compared a detected value of temperature of the molded object obtained from said sensing means with a preset value of temperature of the molded object.

3. The molded object cooling device according to claim 1, wherein the molded object has a form of a sheet.

* * * * *